United States Patent Office 2,778,539
Patented Jan. 22, 1957

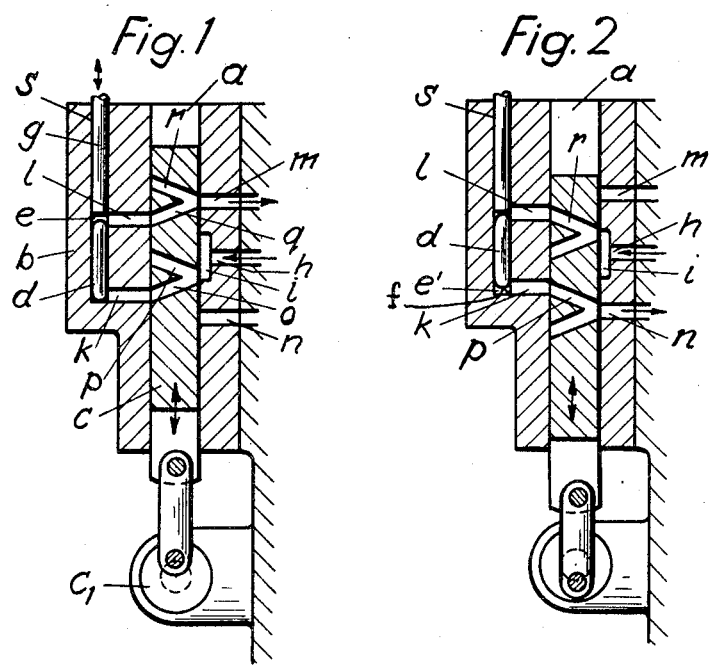

2,778,539

DEVICE FOR FUEL-METERING, IN PARTICULAR, FUEL-INJECTION FOR INTERNAL COMBUSTION ENGINES

Wolf-Dieter Bensinger, Muhlacker, Wurttemberg, Germany, assignor to Daimler-Benz Aktiengesellschaft, Stuttgart-Unterturkheim, Germany Original application September 27, 1949, Serial No. 118,093, now Patent No. 2,673,662, dated March 30, 1954. Divided and this application February 24, 1954, Serial No. 412,349

1 Claim. (Cl. 222—250)

The invention relates to a device for fuel-metering, in particular, fuel-injection for internal combustion engines, originally disclosed in application Ser. No. 118,093, filed September 27, 1949, now Patent 2,673,662, issued March 30, 1954, of which this application is a division.

It is, above all, an object of the invention to render possible a very accurate and uniform metering of fuel charges, even when minute amounts are to be measured, and to overcome thereby the difficulties experienced in conventional fuel-injection pumps.

It is another object of the invention to provide a device for such an accurate and uniform fuel-metering, for instance, of the fuel charge to be injected in sequence at each combustion period, that even at the highest engine speeds or highest rate of injections per minute (for example, up to 30,000 per minute), an accurate and uniform fuel-metering is assured.

The invention, above all, is applicable to low-pressure injection, for instance, gasoline injection, if occasion arises it may, however, also be employed for high-pressure injection.

A feature of the present invention, consists essentially in that a charge of fuel of the right amount for one injection is divided off from the inflowing fuel, and hereupon this divided off and metered amount is displaced by the pressure of the subsequently inflowing fuel and then conducted to the injection point. As a rule, the fuel is delivered to the metering device under the same pressure as that of the subsequently inflowing fuel, by which it is pushed to the injection points. Fuel-displacement and metering of the subsequently inflowing fuel are here so interdependent that a practically perfect, uniform metering is attained, since only as much fuel flows into the metering device as can flow out of it.

For the practical application of the invention there is provided, in particular, a free moving, for example, reciprocating needle-like, or pin-like plunger member which is alternately seated by the fuel pressure on one or the other plunger side, whereby the plunger member performs a certain limited stroke, and thereby the fuel on the opposite side is metered and forced into the injection line.

For fuel control there is provided, for example, a reciprocating slide valve, outside of which the metering and displacing plunger may be arranged. The employment of a needle-like, or pin-like plunger member of small diameter, secures the further advantages that the mass of the plunger member may be kept very small which is of essential importance especially for a very high rate of strokes, that the fuel-metering and regulation of the same may be accomplished with the greatest accuracy by changing the stroke, and that leaking on the bearing surfaces of the plunger barrel is practically impossible. Furthermore, the device is of simplest design, and with respect to space and weight affords no outlay that needs to be considered in any way at all. Also the regulation of the fuel charge may be controlled in the simplest manner, selectively or automatically, for example, in dependence upon the engine speed by changing the stroke of the plunger. Furthermore, driving pressure and regulating pressure are very low.

The invention is, in particular, applicable for engines with injection points becoming effective by pairs in sequence, the fuel being delivered to one pair, or several pairs of injection points by one device. However, each device may merely deliver fuel to one individual injection point, by bringing the injection line into communication alternately with one or the other side of the plunger member.

In the drawing a fuel-metering device, in which the invention is embodied, is illustrated diagrammatically by way of example, in a somewhat simplified manner, Figs. 1 and 2 showing the plunger or control member in one or the other of the end or control positions.

In a bore $a$ of a metering-device housing $b$ (Fig. 1), a control valve $c$ is reciprocated by a cam $c_1$ driven, for example, at one-half crankshaft revolutions by the engine that is to be supplied with the fuel charge. In a laterally located small bore $s$ parallel to the bore $a$, the needle-like piston or plunger member $d$, provided with rounded ends as a plunger crown, is supported, with axial clearance $e$ (Fig. 1) or $e'$ (Fig. 2), between the end surface $f$ of the bore $s$ and the needle-like axially adjustable regulating rod $g$. The latter may be adjusted, manually or in some other way directly. The fuel, for instance, being conveyed by a diaphragm pump serving as delivery pump, flows at $h$ into a control slot $i$, from which, depending on the axial position of the control valve $c$, it flows either through the cross bore $k$ (Fig. 1) or through the cross bore $l$ (Fig. 2) into the clearance $e'$ or the clearance $e$. The momentary opposite plunger end is, at this instant, either in communication with the injection line $m$ (Fig. 1) through the cross bore $l$, or in communication with the injection line $n$ (Fig. 2) through the cross bore $k$.

In the axial position according to Fig. 1, the plunger member $d$ is first in the lower position as shown. Through the fuel entering by way of $k$ it is pushed upwardly against the regulating rod $g$ by the pressure of the feed pump. Coincidentally it pushes the fuel, which previously has been confined at $e$, through $l$ into the injection line $m$, in a metered quantity in accordance with the diameter and stroke of the plunger member. Simultaneously with this, the same amount of fuel has entered at the lower plunger side (proportionately to clearance $e'$ Fig. 2), and is there shut off from the rest of the in-flowing fuel by further axial displacement of the valve $c$. As soon as the valve, after one-half rotation of the cam $c_1$, has reached the position according to Fig. 2, the fuel through $l$ passes over to the upper plunger side, whereby $d$ is pushed downwardly, and the fuel, which previously has been confined at $e'$, is then through $k$ pushed into the injection line $n$. As long as the setting of the regulating rod $g$ is not changed, the amount of fuel actually displaced and injected will always be constant. By an axial displacement of $g$, however, the stroke of the plunger member $d$ and, by this way, the quantity of the inflowing and the displaced fuel may be changed and regulated.

Instead of only one transverse bore $k$ and one transverse bore $l$ arranged in the control valve, there may be provided several of them distributed on the circumference of the control valve and adapted to deliver fuel to a corresponding number of injection points. Generally, a feeding pressure of the feeding pump of approximately 4 lb. per sq. in. above the pressure in the cylinders is sufficient. Therefore, for example, for gasoline injection into the suction manifold, or into the uncompressed or low-compressed working air in the cylinder, the pump may work with relative low pressures. Nevertheless, in conformity with the invention, pressures of 1400 lbs. per sq. in. or more can also be controlled by the device.

The bores $k$ and $l$ are arranged so that they always deliver the fuel to the same plunger side. Four bores $o$, $p$, $q$, $r$ serve as control. In one end position of the control valve $c$, the bore $o$ controls the inflow of the fuel from $h$ to $k$, and likewise, the bore $q$ the outflow of the fuel, displaced at $e$, from $l$ to the injection line $m$. In the other end position of the control valve $c$, the bore $p$ serves the purpose to conduct the fuel, displaced at $e'$, to the injection line, while the bore $r$ controls the inflow of the fuel from $h$ to $l$. Otherwise, the manner of operation is, on principle, the same as in the embodiment according to Figs. 1 and 2. The device according to Figs. 1 and 2 offers the advantage of lesser sensitiveness against seizing, especially, in connection with gasoline operation. But it is also useable to advantage for other fuels and other applications.

Although only one preferred form and application of of the invention has been described in detail, it will be apparent to those skilled in the art that various modifications may be made without departing from the scope of the appended claim.

What I claim is:

A fluid metering and supply device comprising a housing having first and second parallel bores therein, a control valve having a uniform diameter throughout its length and mounted for automatic reciprocation in the first bore, a needle-shaped piston member with rounded ends axially movable in the second bore, a pair of abutments limiting the movement of the piston member in the second bore and defining therewith two end spaces, one of the abutments being fixed in the housing and the other being axially movable therein, communication ducts between the end spaces and the first bore, two discharge ducts opening into the first bore, one of said discharge ducts being at a level above its associated communication duct, the other of said discharge ducts being at a level below its associated communication duct, a supply duct opening into the first bore between the two discharge ducts, two bifurcated conduit means in the control valve, each having a single opening on one side of the control valve positioned to coact with the supply duct and one of the respective discharge ducts, and having two spaced openings on the other side of the control valve to coact with one of the communication ducts, whereby one end space, in one end position of the valve, is in communication with the supply duct while the other is in communication with one of the discharge ducts, whereas, in the other end position of the valve, the one space is in communication with the other discharge duct while the other is in communication with the supply duct.

References Cited in the file of this patent

UNITED STATES PATENTS 2,406,239    Morgenroth            Aug. 20, 1946

FOREIGN PATENTS 235,587    Great Britain            Apr. 1, 1926